June 5, 1934. W. HAULDREN 1,961,217
MOWING MACHINE
Filed June 2, 1933 2 Sheets-Sheet 2

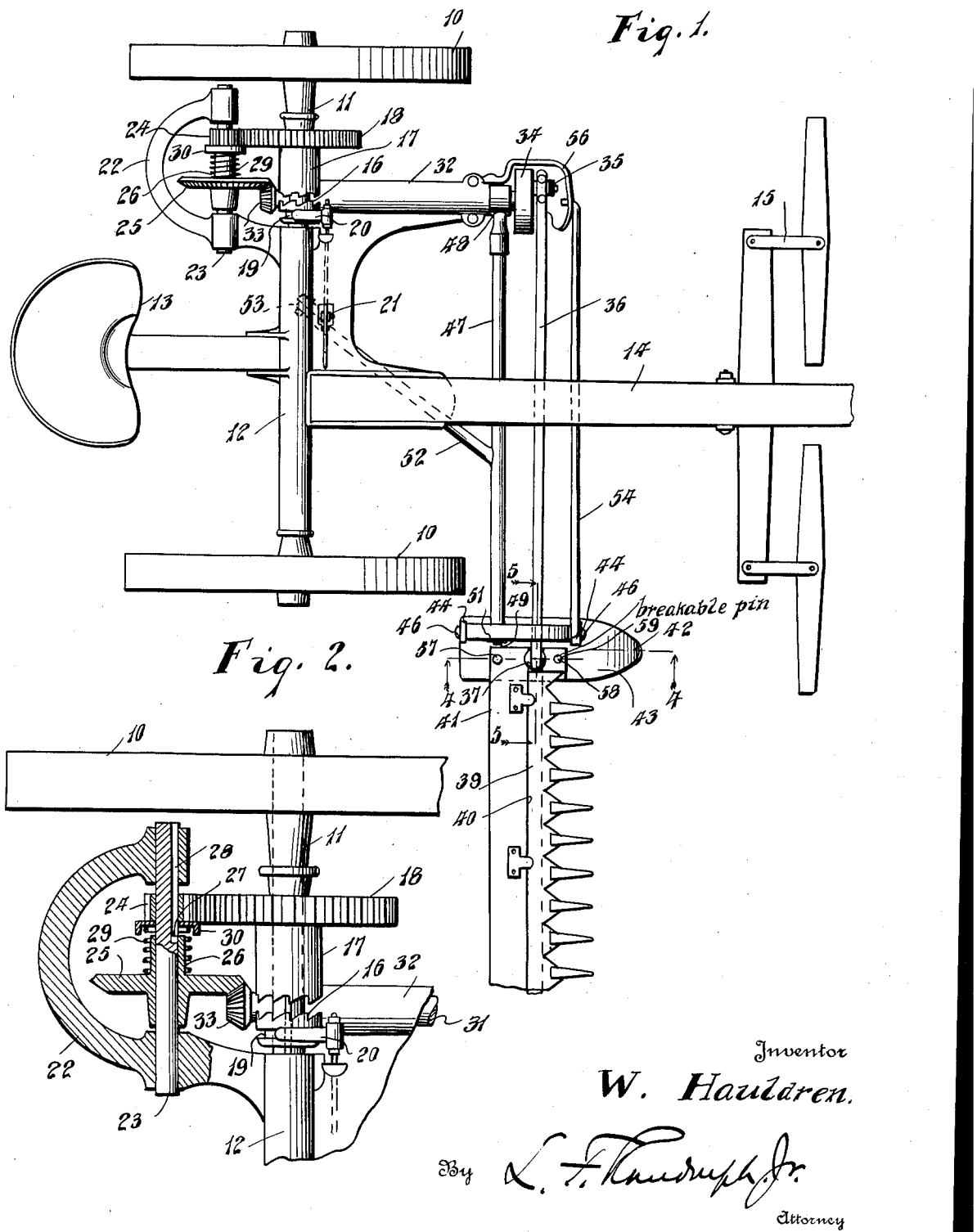

Inventor
W. Hauldren,
By L. F. Randolph Jr.
Attorney

Patented June 5, 1934

1,961,217

UNITED STATES PATENT OFFICE 1,961,217

MOWING MACHINE

Walter Hauldren, Whitmans, W. Va.

Application June 2, 1933, Serial No. 674,109

4 Claims. (Cl. 56—271)

My invention relates to a mowing or reaping machine and it aims to provide a construction which will avoid breakage of the cutter bar, pitman or any of the associated parts, and will also minimize the danger of the draft animals stumbling or falling in the event the machine encounters an obstruction in its path.

Another object is to provide a construction which will enable parts of the mowing machine, particularly the cutting mechanism and the gearing to drive the same, to yield in the event such an obstruction is encountered, the yielding parts thereafter being replaceable for resumption of operation after removal of the obstruction or driving of the machine out of line therewith. Such a machine is particularly desirable in rural districts where repair parts are not readily accessible.

The more specific objects and advantages will become apparent from a consideration of the description following taken in connection with accompanying drawings illustrating an operative embodiment.

In said drawings:—

Figure 3:
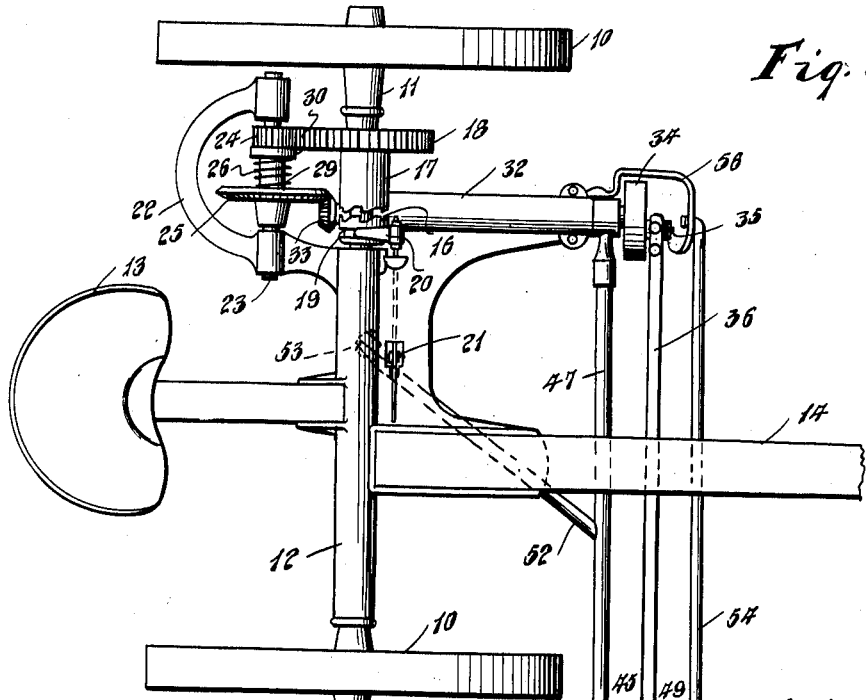
Figure 5:
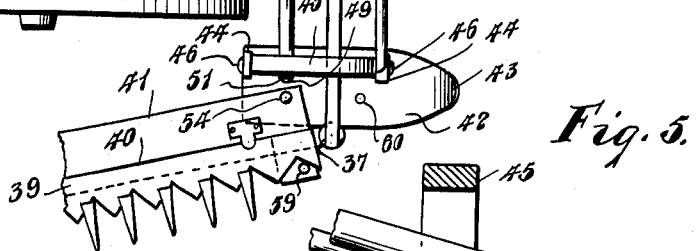
Figure 4:
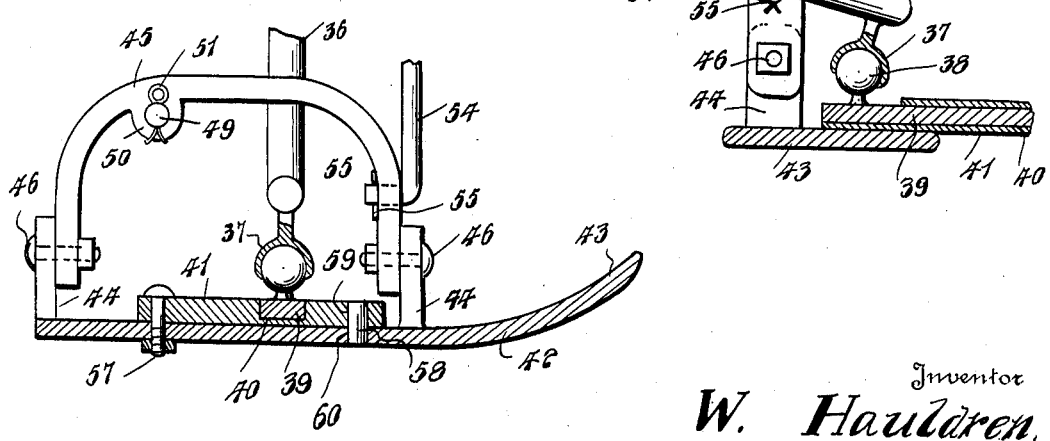

Figure 1 is a plan view of a mowing machine constructed in accordance with the invention, the cutting mechanism being shown in operative position, Figure 2 is an enlarged fragmentary view partly showing in plan and partly in section, the yieldable drive gearing employed, Figure 3 is a plan view of the parts of Figure 1, but showing the cutting mechanism in "yielded" position, Figure 4 is a detail sectional view taken on the line 4—4 of Figure 1, and Figure 5 is a detail sectional view taken on the line 5—5 of Figure 1.

Referring specifically to the drawings wherein like reference characters designate like or similar parts, 10 designates ground wheels rigid with an axle 11, suitably journaled on a frame 12 having a driver's seat at 13 and a draft tongue or pole 14 with trees at 15 for hitching of the draft animal. Splined to the shaft or axle 11 so as to rotate therewith and also be slidable thereon is a clutch section 16 which is adapted to be engaged with a clutch section 17 carried by a gear wheel 18. The gear wheels 17 and 18 are loosely mounted on the axle 11 but rotate therewith when the clutch sections 16 and 17 are in engagement. The clutch section 16 has an annular groove 19 engaged by a yoke 20, which is shifted manually by any conventional means or mechanism at 21, within reach of the driver while seated.

On the frame 12 is a generally arcuate bearing bracket 22 having a counter-shaft 23 journaled therein. Keyed or rigidly and removably fixed on the shaft 23 is a gear or pinion 24 enmeshed with the gear 18. Also disposed about the shaft 23 is a bevel gear wheel 25, the same rotating with the shaft 23 since it has a collar 26 provided with a lug or projection 27 disposed in a longitudinal groove 28 of the shaft. Gear wheel 25 is slidable on the shaft 23 and constantly urged in the direction of the driver's seat by means of an expansive coil spring 29 surrounding the collar, abutting the gear 25 at one end and a cup-shaped enlargement 30 on the gear 24 at the other end.

A shaft 31 to actuate the sickle or cutting mechanism is disposed longitudinally of the frame journaled in a bearing section or sleeve 32 thereof. Shaft 31 has a bevel gear 33 thereon enmeshed with the gear wheel 25. At the forward end, shaft 31 carries a disk 34 to which is eccentrically pivoted at 35, a pitman 36 having a depending socket member 37 at one end engaging a ball 38 on a sickle or cutter-bar 39 slidably mounted in a groove or slot 40 of a guard or finger bar 41. The cutter-bar 39 and guard 41 with respect to their teeth are of usual or conventional construction.

In order to mount the cutting mechanism, a plate or shoe 42 is preferably disposed in contact with the ground outwardly of one of the wheels 10, such shoe preferably having its forward end deflected upwardly at 43 and also having upstanding lugs 44. An arch-shaped bracket 45 is removably bolted at 46 to the lugs 44. A supporting rod 47 has a collar 48 at one end whereby it is loosely connected about the shaft 31, the other end of the rod 47 at 49 extending through an eye member 50 on the bracket 45 and beyond the same receiving a removable cotter 51. Branching from the rod 47 is an arm 52 which is connected at 53 to the frame 12. In addition, a supporting rod 54 is removably attached at 55 to the bracket 45, the same extending from a shield plate 56 disposed about the disk 34 and adjacent parts and rigid with the frame 12.

A bolt 57 connects the guard bar 41 to the shoe, in combination with a breakable or fracturable pin 58 adapted to be disposed in alining openings 59 and 60 in the guard bar 41 and shoe 42. The pitman 36 operates through the space afforded by the bracket 45.

The parts will normally operate in the position shown in Figure 1 but when a stump or other obstruction is encountered, the cutting mechanism, that is the guard bar 41 and the cutter-bar 39 are adapted to yield, fracturing or breaking the pin 58 and swinging on the bolt 57 as a pivot as shown in Figure 3. To this end pin 58 may be made of wood or it may be of a metal which will fracture under the predetermined strain, or made of any other suitable material.

When the vehicle travels to and from the field and it is not desired to operate the cutting mechanism, the clutch sections 16 and 17 are disengaged as shown in the drawings. However, to operate the cutting mechanism, such clutch sections are engaged and as a result the operation of the ground wheels 10 and axle 11 turn through the clutch section 16, the clutch section 17, gears 18, 24, shaft 23, gear 25, gear 33, shaft 31, disk 34 and accordingly reciprocates the pitman 36 and the cutter-bar 39 relatively to the finger bar or guard 41.

Upon encountering a stump or other obstruction as previously suggested, the pin 58 will break and hence the cutting mechanism will swing to the rear as shown in Figure 3, thus avoiding breakage of the cutting mechanism, pitman 36, shaft 14 or any of the associated parts and also minimizing the danger of the draft animals stumbling and injuring themselves. In addition, to avoid danger of breakage of the drive gearing and the connected members and also in the event sticks or the like should enter between the cutter-bar and the guard bar and the latter fails to operate, the gear 33 would be relatively rigid and hence the gear 25 would be caused to yield relatively thereto against the tension of the spring 29.

Various changes may be resorted to provided they fall within the spirit and scope of the invention.

What is claimed is:—

1. A machine of the class described having a frame, a shaft journaled thereon, a shoe adapted to travel on the ground, means extending from the frame positioning said shoe, a guard bar, a bolt connecting the guard bar to the shoe, a fracturable pin connecting the guard bar to the shoe, a cutter-bar slidable on the guard bar, pitman means operated by said shaft to actuate the cutter-bar, said fracturable pin enabling the cutter-bar and guard bar to yield on the bolt as a pivot through contact with an obstruction, drive gearing for said shaft, said drive gearing including a gear member, means yieldingly holding the same in mesh with its companion, whereby the yieldable gear will be displaced upon failure of the cutter-bar and guard bar to operate.

2. A machine of the class described having a frame, a shaft journaled thereon, a shoe adapted to travel on the ground, means extending from the frame positioning said shoe, a guard bar, a bolt connecting the guard bar to the shoe, a fracturable pin connecting the guard bar to the shoe, a cutter-bar slidable on the guard bar, pitman means operated by said shaft to actuate the cutter-bar, said fracturable pin enabling the cutter-bar and guard bar to yield on the bolt as a pivot through contact with an obstruction, a bearing bracket on the frame, a shaft journaled in the bearing bracket having a gear thereon, means to drive said gear through travel of the machine, a gear on the first mentioned shaft, a slidable gear in engagement with the last mentioned gear, and a spring urging the slidable gear into mesh with its companion for the purpose specified.

3. A machine of the class described having a frame, a shaft journaled thereon, a shoe adapted to travel on the ground, means extending from the frame positioning said shoe, a guard bar, a bolt connecting the guard bar to the shoe, a fracturable pin connecting the guard bar to the shoe, a cutter-bar slidable on the guard bar, pitman means operated by said shaft to actuate the cutter-bar, said fracturable pin enabling the cutter-bar and guard bar to yield on the bolt as a pivot through contact with an obstruction, a bearing bracket on the frame, a shaft journaled in the bearing bracket having a gear thereon, means to drive said gear through travel of the machine, a gear on the first mentioned shaft, a slidable gear in engagement with the last mentioned gear, a spring urging the slidable gear into mesh with its companion, the second mentioned shaft having a slot, a slidable gear having a sleeve provided with a lug disposed in said slot and about which sleeve said spring is disposed.

4. A machine of the class described having cutting mechanism, a shaft to operate the same provided with a gear, a gear enmeshed with the first mentioned gear to drive the same, one of said gears being slidable, spring means urging enmeshing of said gears, said slidable gear being automatically displaceable upon failure of the cutting mechanism to operate through the assumption of a relatively rigid position of the first mentioned gear.

WALTER HAULDREN.